(12) United States Patent
Nozaki et al.

(10) Patent No.: US 11,977,794 B2
(45) Date of Patent: May 7, 2024

(54) INFORMATION PROCESSING DEVICE, PRINT SYSTEM, PRINT CONTROL METHOD, AND NON-TRANSITORY COMPUTER-READABLE STORAGE MEDIUM STORING PRINT CONTROL PROGRAM

(71) Applicant: SEIKO EPSON CORPORATION, Tokyo (JP)

(72) Inventors: Genki Nozaki, Nagano (JP); Hideyoshi Itokawa, Nagano (JP); Motomu Miyajima, Nagano (JP); Tomoki Matsuzawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/321,022

(22) Filed: May 22, 2023

(65) Prior Publication Data
US 2023/0376254 A1 Nov. 23, 2023

(30) Foreign Application Priority Data

May 23, 2022 (JP) .................................. 2022-083629

(51) Int. Cl.
*G06F 3/12* (2006.01)

(52) U.S. Cl.
CPC .......... *G06F 3/1209* (2013.01); *G06F 3/1206* (2013.01); *G06F 3/1236* (2013.01); *G06F 3/1286* (2013.01); *G06F 3/1288* (2013.01)

(58) Field of Classification Search
CPC .... G06F 3/1204; G06F 3/1228; G06F 3/1288; G06F 3/1232; G06F 3/1225; G06F 3/1254; G06F 3/1285; G06F 3/1292; G06F 3/1206; G06F 3/1226; G06F 3/1247; G06F 3/1207; G06F 3/123; G06F 3/1259; G06F 3/1273; G06F 3/1297; G06F 8/65; G06F 3/1205; G06F 3/121; G06F 3/1211; G06F 3/1234; G06F 3/1236; G06F 3/1255; G06F 3/126; G06K 15/00; G06K 15/007; G06K 15/181; G06K 15/021; G06K 15/1805; H04N 1/001; H04N 1/00; H04N 1/00214; H04N 1/00244; H04N 1/00278; H04N 1/00307; H04N 1/00347; H04N 1/00474; H04N 1/00482; H04N 1/40; H04N 2201/001;
(Continued)

(56) References Cited

U.S. PATENT DOCUMENTS 6,023,727 A * 2/2000 Barrett .................... H04L 49/90
709/221
7,180,619 B2 * 2/2007 Ferlitsch ................. G06F 3/121
358/1.15
(Continued)

FOREIGN PATENT DOCUMENTS

JP 2015-092394 A 5/2015

*Primary Examiner* — Negussie Worku
(74) *Attorney, Agent, or Firm* — Global IP Counselors, LLP

(57) ABSTRACT

An information processing device connecting to a print server via a network and connectable to a printing device is provided. The information processing device determines whether the printing device is a compatible printing device compatible with the print server or an incompatible printing device incompatible with the print server, and causes registration processing corresponding to a result of the determination to be executed.

7 Claims, 6 Drawing Sheets

(58) Field of Classification Search
CPC ... H04N 2201/0065; H04N 2201/3242; H04N 5/765; H04N 5/772; H04N 5/907; H04N 5/91; H04N 9/7921; H04N 9/8042; H04N 9/8047; B41J 11/009; H04M 1/72412
USPC ........................................................ 358/1.15
See application file for complete search history.

(56) References Cited

U.S. PATENT DOCUMENTS

| | | | |
|---|---|---|---|
| 8,599,393 B2* | 12/2013 | Lombardo, III | G06F 3/1204 358/1.9 |
| 8,970,862 B2* | 3/2015 | Takamoto | G06F 3/1277 358/1.18 |
| 9,524,130 B2* | 12/2016 | Takamoto | G06F 3/1284 |
| 11,003,401 B2* | 5/2021 | Yamada | G06F 3/1247 |
| 2005/0114696 A1* | 5/2005 | Hashimoto | G06F 21/34 726/26 |
| 2006/0069824 A1* | 3/2006 | Hodder | G06F 3/121 710/72 |
| 2015/0378646 A1* | 12/2015 | James | G06F 3/126 358/1.15 |
| 2016/0291904 A1* | 10/2016 | Fukushima | G06F 3/1234 |
| 2022/0179603 A1* | 6/2022 | Sako | G06F 3/1276 |
| 2023/0315361 A1* | 10/2023 | Saito | G06F 3/1205 358/1.13 |

* cited by examiner

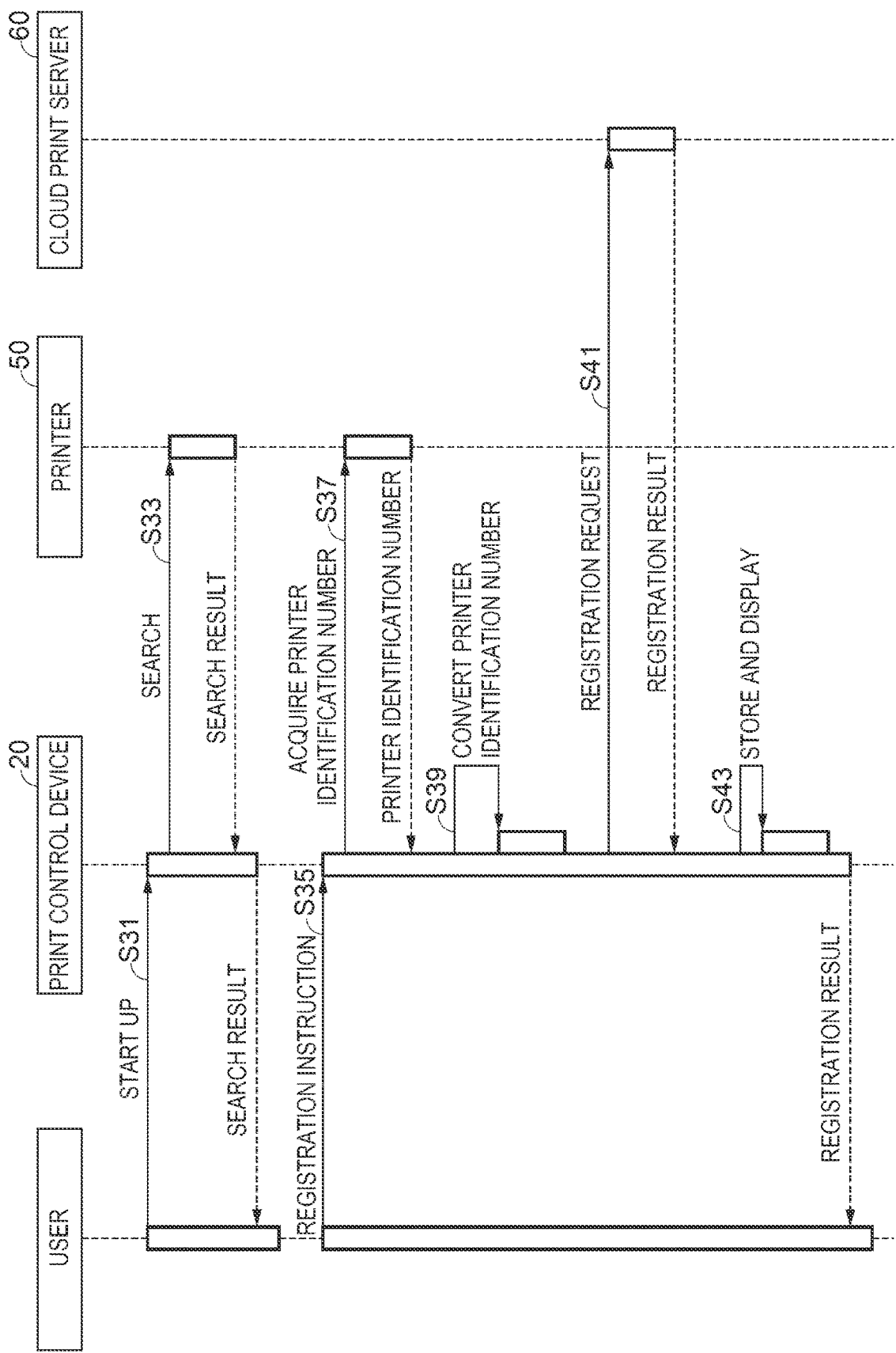

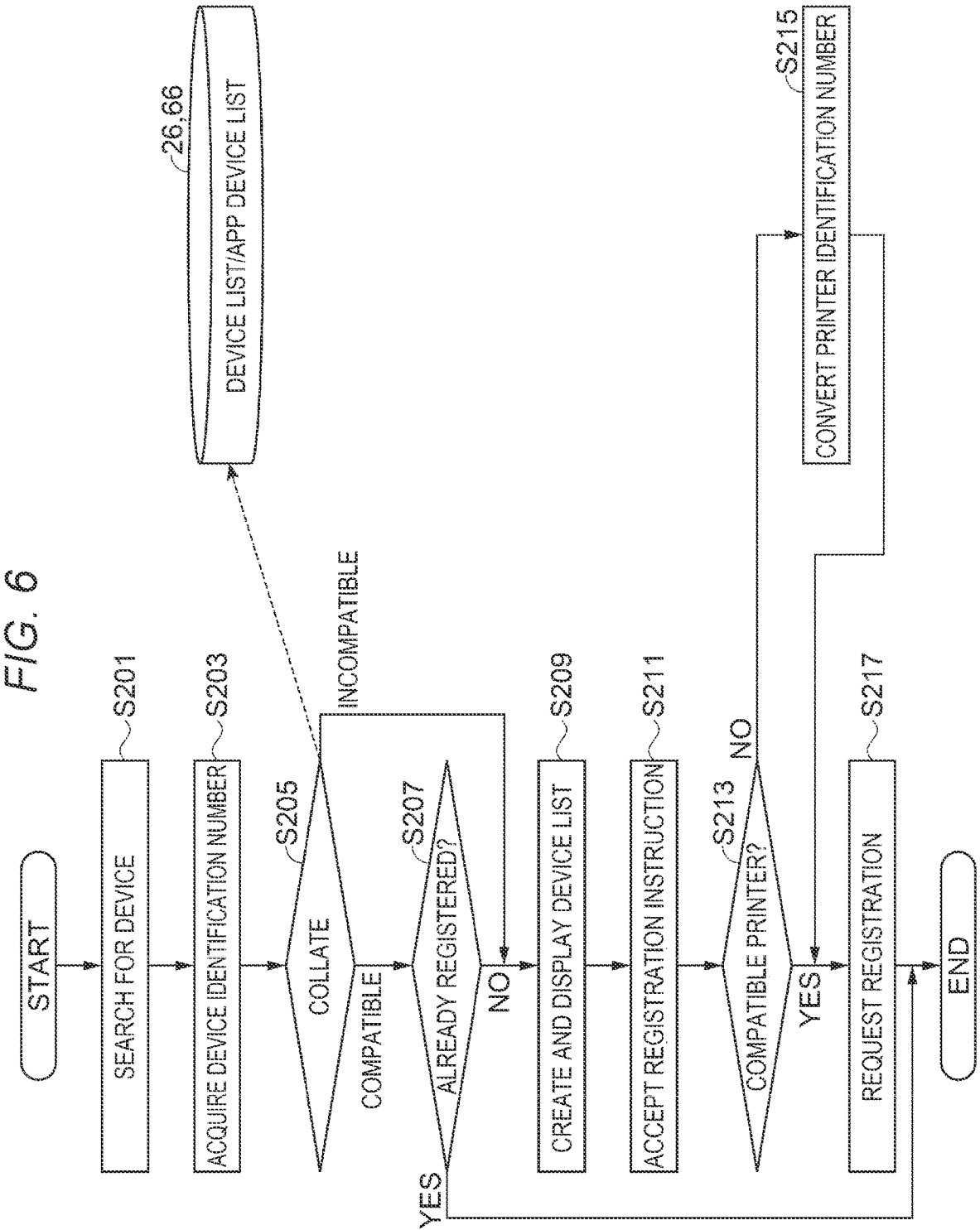

INFORMATION PROCESSING DEVICE, PRINT SYSTEM, PRINT CONTROL METHOD, AND NON-TRANSITORY COMPUTER-READABLE STORAGE MEDIUM STORING PRINT CONTROL PROGRAM

The present application is based on, and claims priority from JP Application Serial Number 2022-083629, filed May 23, 2022, the disclosure of which is hereby incorporated by reference herein in its entirety.

BACKGROUND

1. Technical Field

The present disclosure relates to an information processing device, a print system, a print control method, and a non-transitory computer-readable storage medium storing a print control program.

2. Related Art

A cloud print service providing a print function via a network is known. A system described in JP-A-2015-92394 has a cloud print server, a cloud-aware printer, and a legacy printer. The cloud print server provides a cloud print service. The cloud-aware printer can directly communicate with the cloud print server and print. The cloud-aware printer connects to the cloud print server via a network. The legacy printer is not compatible with the communication with the cloud print server. The legacy printer connects to a router or a device. The router or the device connects to the cloud print server via a network. In the system described in JP-A-2015-92394, the cloud-aware printer and the legacy printer are configured to be able to print.

The cloud-aware printer and the legacy printer employ different connection formats from each other with the cloud print server. However, it is difficult for a user to determine whether a printer which the user wants to register with the cloud print system is compatible with the cloud print service or not.

SUMMARY

According to an aspect of the present disclosure, an information processing device connecting to a print server via a network and connectable to a printing device is provided. The information processing device includes a communication unit receiving a result of acquisition of identification information identifying the printing device from the printing device, and a registration processing unit causing the print server to execute registration processing of registering the printing device. The registration processing unit determines whether the printing device is a compatible printing device compatible with the print server or an incompatible printing device incompatible with the print server, based on the result of acquisition, and causes the registration processing corresponding to a result of the determination to be executed.

According to another aspect of the present disclosure, a print system including a printing device, an information processing device, and a print server is provided. The printing device includes a print storage unit storing identification information, and a print communication unit communicatively connecting to the information processing device. The information processing device includes a communication unit communicatively connecting to the printing device, a connection unit communicatively connecting to the print server via a network, and a registration processing unit causing the print server to execute registration processing of registering the printing device. The print server includes a server communication unit communicatively connecting to the information processing device via the network. The communication unit of the information processing device receives a result of acquisition of the identification information of the printing device. The registration processing unit of the information processing device determines whether the printing device is a compatible printing device compatible with the print server or an incompatible printing device incompatible with the print server, based on the result of acquisition, and causes the registration processing corresponding to a result of the determination to be executed.

According to still another aspect of the present disclosure, a print control method for causing registration processing of registering a printing device with a print server to be executed is provided. The print control method includes receiving a result of acquisition of identification information of the printing device, determining whether the printing device is a compatible printing device compatible with the print server or an incompatible printing device incompatible with the print server, based on the result of acquisition, and causing the registration processing corresponding to a result of the determination to be executed.

According to still another aspect of the present disclosure, a non-transitory computer-readable storage medium storing a print control program is provided. The print control program operates in an information processing device causing registration processing of registering a printing device with a print server to be executed. The print control program causes the information processing device to receive a result of acquisition of identification information of the printing device, determine whether the printing device is a compatible printing device compatible with the print server or an incompatible printing device incompatible with the print server, based on the result of acquisition, and cause the registration processing corresponding to a result of the determination to be executed.

BRIEF DESCRIPTION OF THE DRAWINGS

FIG. 4 is a sequence chart of the registration processing in the cloud print system.

FIG. 5 shows a control flow in a print control device for the registration processing.

FIG. 6 shows a control flow in the print control device for the registration processing.

DESCRIPTION OF EXEMPLARY EMBODIMENTS

Figure 1:
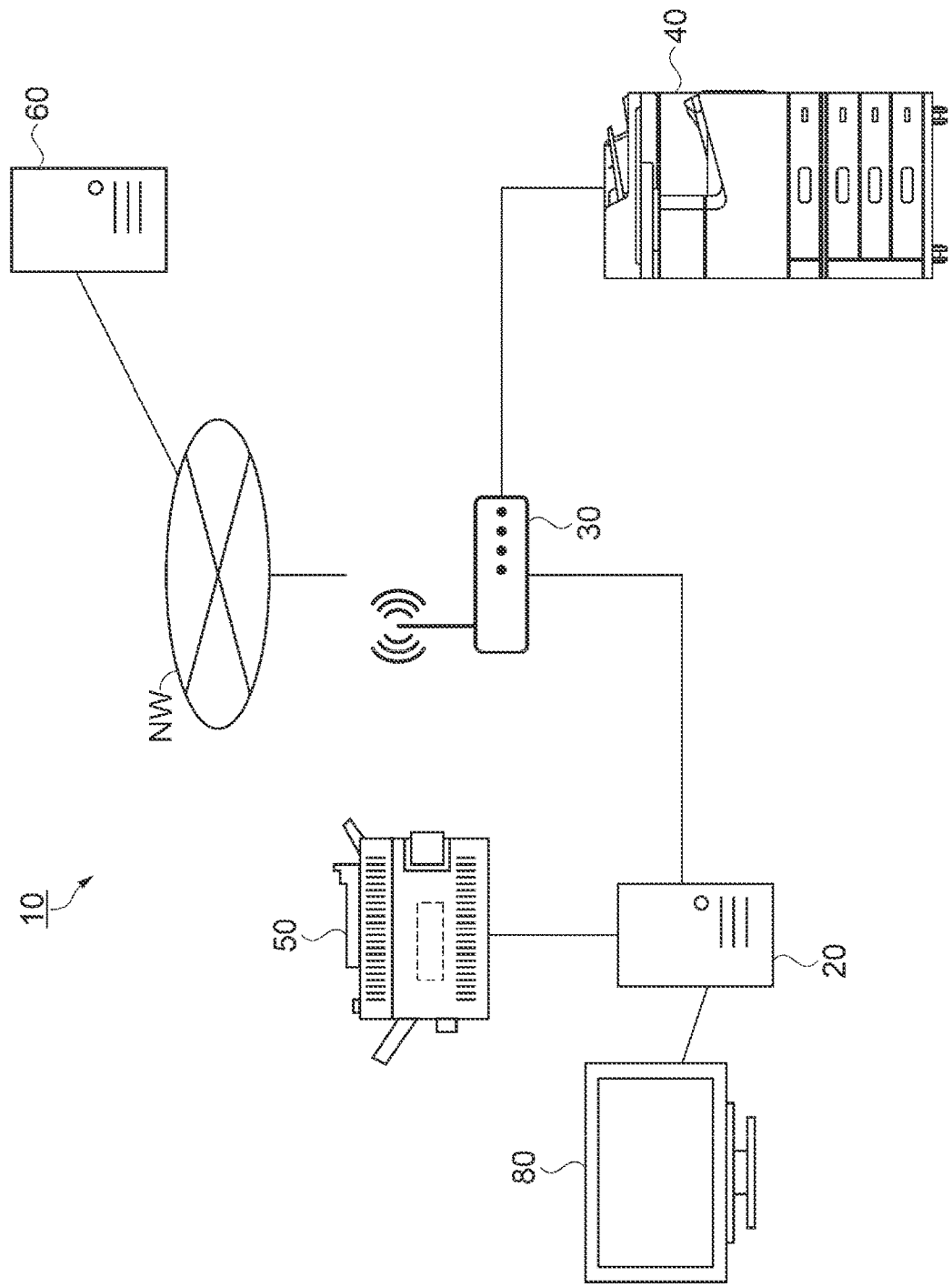
FIG. 1 shows a schematic configuration of a cloud print system.

FIG. 1 shows a schematic configuration of a cloud print system 10. The cloud print system 10 is a system providing a service for printing to a user. The cloud print system 10 shown in FIG. 1 has a print control device 20, a router 30, a multifunction peripheral 40, a printer 50, and a cloud print server 60. In the cloud print system 10 shown in FIG. 1, one multifunction peripheral 40 and one printer 50 are illustrated. However, this is not limiting. The cloud print system 10 may have a plurality of multifunction peripherals 40. The cloud print system 10 may have a plurality of printers 50. The cloud print system 10 is equivalent to an example of a print system.

The print control device 20 shown in FIG. 1 communicatively connects to the multifunction peripheral 40 and the printer 50. The print control device 20 may communicatively connect to at least one of the multifunction peripheral 40 and the printer 50. The print control device 20 communicatively connects to the cloud print server 60 via a communication network NW. The print control device 20 causes the cloud print server 60 to execute registration processing of registering the multifunction peripheral 40 or the printer 50 with the cloud print server 60. The print control device 20 may be coupled to a display 80. The display 80 displays various screens under the control of the print control device 20. The display 80 may be unified with the print control device 20. The print control device 20 is equivalent to an example of an information processing device.

The router 30 connects a LAN (local area network) to the communication network NW. The communication network NW is, for example, a WAN (wide area network). The LAN is, for example, a communication line constructed in an office or a floor. The router 30 shown in FIG. 1 connects the print control device 20 and the multifunction peripheral 40 in such a way that the print control device 20 and the multifunction peripheral 40 can communicate with each other via the LAN. The router 30 connects the print control device 20 and the cloud print server 60 in such a way that the print control device 20 and the cloud print server 60 can communicate with each other via the communication network NW. The router 30 connects the multifunction peripheral 40 and the cloud print server 60 in such a way that the multifunction peripheral 40 and the cloud print server 60 can communicate with each other via the communication network NW. The communication network NW is equivalent to an example of a network.

The multifunction peripheral 40 has a print function of printing on a print medium and a copy function of copying an original document. The multifunction peripheral 40 may have a fax function of sending and receiving a fax. The multifunction peripheral 40 can print print data including a general-purpose print command such as PWG-Raster, PDF, JPEG, or PostScript. The multifunction peripheral 40 is configured to be able to communicate with the cloud print server 60 via the communication network NW. When registered with the cloud print server 60, the multifunction peripheral 40 can print print data transmitted from the cloud print server 60. The function of printing print data transmitted from the cloud print server 60 is referred to as a cloud print function. A device having the cloud print function is referred to as a compatible printer compatible with the cloud print server 60. The multifunction peripheral 40 shown in FIG. 1 is a compatible printer. When not registered with the cloud print server 60, the multifunction peripheral 40 cannot receive print data from the cloud print server 60. The multifunction peripheral 40 communicatively connects to the print control device 20 via the router 30. The multifunction peripheral 40 is an example of a printing device. The compatible printer is equivalent to an example of a compatible printing device.

The printer 50 prints on a print medium. The printer 50 is, for example, an inkjet printer. The printer 50 ejects an ink onto a print medium and thus prints thereon. The printer 50 communicatively connects to the print control device 20.

The printer 50 may be able or unable to print print data including a general-purpose print command. When unable to print print data including a general-purpose print command, the printer 50 cannot print print data transmitted from the cloud print server 60. A device that cannot print print data transmitted from the cloud print server 60 is referred to as an incompatible printer. The printer 50 may be not communicatively connected to the cloud print server 60. When not communicatively connected to the cloud print server 60, the printer 50 cannot receive print data from the cloud print server 60. A device that is not communicatively connected to the cloud print server 60 is referred to as an incompatible printer. The printer 50 shown in FIG. 1 is locally connected to the print control device 20 and is not connected in such a way as to be able to communicate with the cloud print server 60. The printer 50 shown in FIG. 1 is an incompatible printer. The printer 50 is an example of the printing device. The incompatible printer is equivalent to an example of an incompatible printing device.

The cloud print server 60 provides a cloud print service. The cloud print service, for example, transmits print data stored in the cloud print server 60 directly to a device having the cloud print function. The transmitted print data includes a general-purpose print command such as PWG-Raster, PDF, JPEG, or PostScript. The device having the cloud print function can print the print data transmitted from the cloud print server 60. The user transmits image data from a portable terminal such as a smartphone to the cloud print server 60. The cloud print server 60 converts the received image data into print data. When the cloud print server 60 has received a print instruction, the cloud print server 60 transmits the print data to the device having the cloud print function. The device having the cloud print function prints the print data transmitted from the cloud print server 60. The user can print the image data saved in the portable terminal. The user can print the image data by remote control.

The cloud print server 60 connects to the communication network NW. The cloud print server 60 communicatively connects to the router 30 via the communication network NW. The cloud print server 60 is connected in such a way as to be able to communicate with the print control device 20 and the multifunction peripheral 40, which are connected to the LAN. The cloud print server 60 shown in FIG. 1 is formed of one server device. However, this is not limiting. The cloud print server 60 may be formed of a plurality of server devices. The cloud print server 60 is equivalent to an example of a print server.

Figure 2:
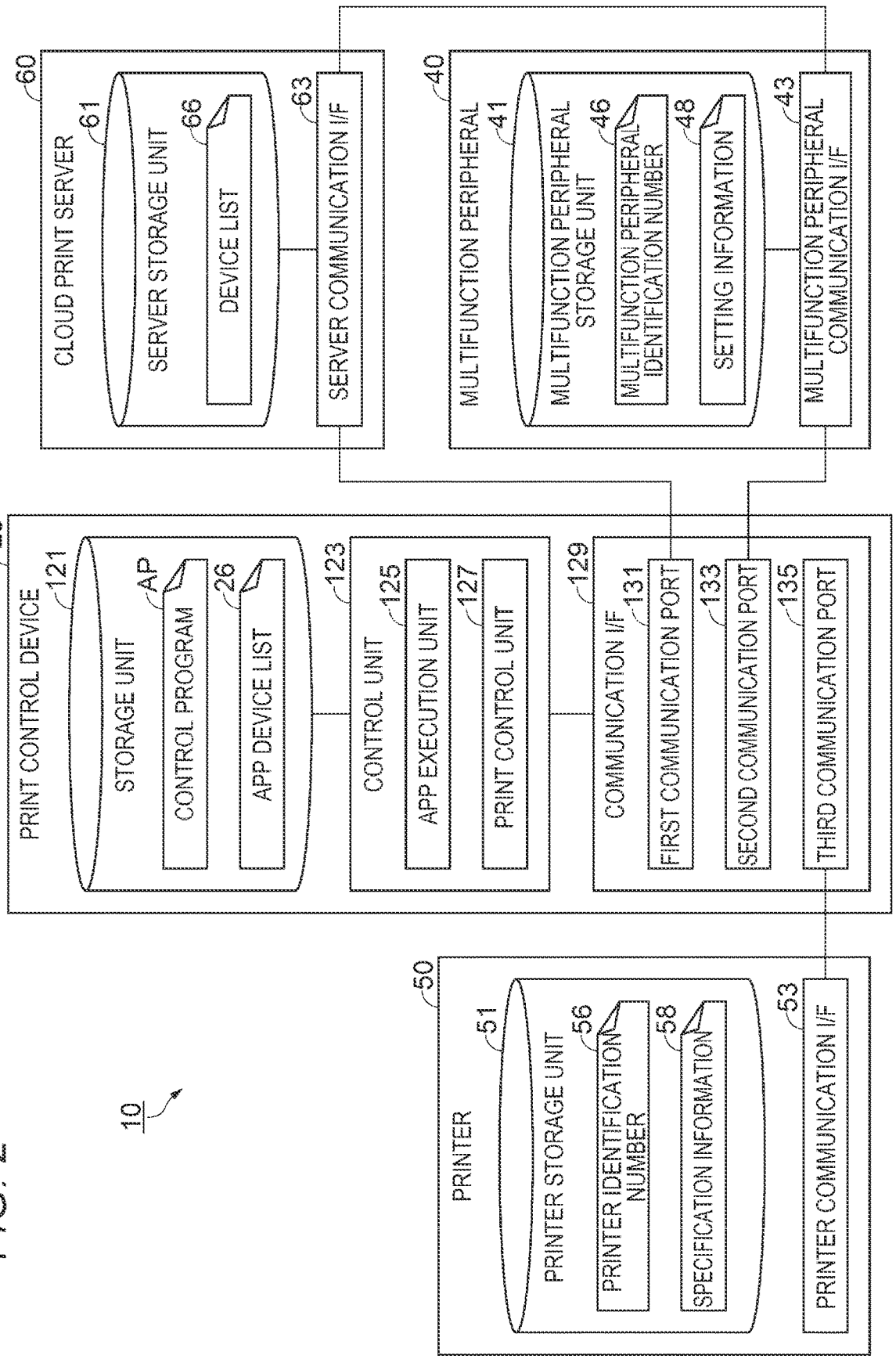
FIG. 2 shows a block configuration of the cloud print system.

FIG. 2 shows the block configuration of the cloud print system 10. FIG. 2 shows the print control device 20, the multifunction peripheral 40, the printer 50, and the cloud print server 60. In FIG. 2, the router 30 is omitted. In FIG. 2, an interface is referred as I/F.

The print control device 20 has a storage unit 121, a control unit 123, and a communication interface 129. The print control device 20 is a computer performing various kinds of processing. The print control device 20 may have an input/output unit or the like, not illustrated. The print control device 20 may be coupled to an input device such as a mouse.

The storage unit 121 stores various data and various programs. The storage unit 121 shown in FIG. 2 stores a control program AP and an app device list 26. The storage unit 121 may store a printer driver or the like. The storage unit 121 is formed of a ROM (read-only memory) and a RAM (random-access memory) or the like. The storage unit 121 may have a magnetic storage device such as an HDD (hard disk drive), and a semiconductor memory or the like. The storage unit 121 is equivalent to an example of a storage unit.

The control program AP operates in the control unit 123. The control program AP causes the cloud print server 60 to execute the registration processing of the multifunction peripheral 40 or the printer 50. As the user causes the control program AP to operate, the control unit 123 executes a print control application. The control program AP is equivalent to an example of a print control program.

The app device list 26 has device information compatible with the cloud print server 60 providing a cloud print service. The app device list 26 is stored in the storage unit 121 when the control program AP operates. The app device list 26 is equivalent to an example of an identification information list.

When the print control device 20 has received a device list 66, described later, from the cloud print server 60, the print control device 20 may store the received device list 66 as the app device list 26 in the storage unit 121. The communication interface 129, described later, receives the device list 66 from the cloud print server 60. The storage unit 121 stores the device list 66 received by the communication interface 129, as the app device list 26. Alternatively, when the print control device 20 has received the device list 66 from the cloud print server 60, the print control device 20 may update the app device list 26 with the device list 66.

The communication interface 129 may receive the device list 66 from the cloud print server 60, and the storage unit 121 may store the device list 66 received by the communication interface 129.

The print control device 20 acquires the device list 66 from the cloud print server 60 and therefore can securely determine whether the device is compatible with the cloud print server 60 or not.

The control unit 123 is a controller controlling the print control device 20. The control unit 123 is, for example, a processor having a CPU (central processing unit). The control unit 123 may be formed of one processor or a plurality of processors. The control unit 123 may have a memory such as a RAM or a ROM. The memory functions as a work area for the control unit 123.

As the control program AP is made to operate, the control unit 123 functions as an app execution unit 125. The app execution unit 125 is a functional unit operating in the control unit 123. As the user causes the control program AP to operate, the print control application starts up. The user operates the print control application and thus causes the app execution unit 125 to operate.

The app execution unit 125 transmits, to the cloud print server 60, an instruction command giving an instruction to register the multifunction peripheral 40 or the printer 50. The instruction command is transmitted to the cloud print server 60, based on an operation input by the user. By transmitting the instruction command to the cloud print server 60, the app execution unit 125 causes the cloud print server 60 to execute the registration processing. The cloud print server 60 executes the registration processing of the multifunction peripheral 40 or the printer 50 in response to the instruction command. The instruction command is equivalent to a registration request, described later. The app execution unit 125 is equivalent to an example of a registration processing unit. The app execution unit 125 transmits the instruction command via the communication interface 129. Therefore, it can also be understood that the communication interface 129 transmits the instruction command.

The app execution unit 125 operates as a virtual printer. The app execution unit 125 receives print data from the cloud print server 60. The app execution unit 125 transmits the received print data to the printer 50. The app execution unit 125 operates as a virtual printer corresponding to the printer 50 in relation to the cloud print server 60. By operating as a virtual printer, the app execution unit 125 can register the printer 50 with the cloud print server 60. The registration of the virtual printer with the cloud print server 60 is equivalent to the registration of the printer 50 with the cloud print server 60.

The app execution unit 125 transmits various data to devices such as the multifunction peripheral 40 and the printer 50 connected to the print control device 20. The app execution unit 125 transmits data of a general-purpose protocol and data of a dedicated protocol to devices such as the multifunction peripheral 40 and the printer 50. The general-purpose protocol is a standard command of Zeroconf (Bonjour, Avahi), USB Printer Class or the like. The dedicated protocol is a protocol set by the vendor providing the control program AP. The app execution unit 125 transmits various data to the device connected to the print control device 20, and searches for a device and acquires various kinds of information about the device. Each of the multifunction peripheral 40 and the printer 50 is an example of the device.

The app execution unit 125 transmits the data of the general-purpose protocol or the data of the dedicated protocol, as send data, to the multifunction peripheral 40. The send data includes data inquiring about a multifunction peripheral identification number 46 of the multifunction peripheral 40. The multifunction peripheral identification number 46 will be described later. The app execution unit 125 acquires a reply result corresponding to the send data, from the multifunction peripheral 40. The reply result is reply data transmitted from the multifunction peripheral 40 or the presence or absence of reply data. The reply data includes the multifunction peripheral identification number 46. The reply result is equivalent to an example of a result of acquisition of the multifunction peripheral identification number 46. Based on the reply result, the app execution unit 125 determines whether the multifunction peripheral 40 is a compatible printer compatible with the cloud print server 60 or an incompatible printer incompatible with the cloud print server 60. Based on the reply result, the app execution unit 125 can determine that the multifunction peripheral 40 is a compatible printer.

The app execution unit 125 transmits the data of the general-purpose protocol or the data of the dedicated protocol, as send data, to the printer 50. The send data includes data inquiring about a printer identification number 56 of the printer 50. The printer identification number 56 will be described later. The app execution unit 125 acquires a reply result corresponding to the send data, from the printer 50. The reply result is reply data transmitted from the printer 50 or the presence or absence of reply data. The reply data includes the printer identification number 56. The reply result is equivalent to an example of a result of acquisition of the printer identification number 56. Based on the reply result, the app execution unit 125 determines whether the printer 50 is a compatible printer compatible with the cloud print server 60 or an incompatible printer incompatible with the cloud print server 60. Based on the reply result, the app execution unit 125 can determine that the printer 50 is an incompatible printer.

The app execution unit 125 differentiates the registration processing to be executed by the cloud print server 60, based on the result of determining whether the device is a compatible printer or an incompatible printer. The app execution unit 125 causes the cloud print server 60 to execute the registration processing corresponding to the result of the determination. Details of the registration processing will be described later.

The app execution unit 125 may suitably convert the print data received from the cloud print server 60. The app execution unit 125 may transmit the print data received from the cloud print server 60, to a print control unit 127. The app execution unit 125 may transmit data received from the print control unit 127, as print data, to the printer 50.

As the printer driver is made to operate, the control unit 123 functions as the print control unit 127. The print control unit 127 is a functional unit operating in the control unit 123. The printer driver is a program provided by the vendor of the printer 50.

The print control unit 127 converts image data or the like into dedicated print data which the printer 50 is compatible with. The print control unit 127 transmits the dedicated print data to the printer 50. The printer 50 prints, based on the dedicated print data.

The communication interface 129 transmits and receives various data such as image data and print data. The communication interface 129 communicatively connects to an external device such as the multifunction peripheral 40 or the printer 50. The communication interface 129 connects to the external device via a wire or wirelessly in conformity with a predetermined communication protocol. The communication interface 129 has a first communication port 131, a second communication port 133, and a third communication port 135. The first communication port 131, the second communication port 133, and the third communication port 135 are connection connectors or logical ports.

The first communication port 131 shown in FIG. 2 communicatively connects to the cloud print server 60 via the communication network NW. The first communication port 131 is a logical port. The first communication port 131 communicatively connects to the cloud print server 60 in conformity with a protocol compatible with the communication network NW. The first communication port 131 is communicatively connected via a wire or wirelessly via the router 30. The first communication port 131 is equivalent to an example of a connection unit.

The second communication port 133 shown in FIG. 2 communicatively connects to the multifunction peripheral 40 via a LAN. The second communication port 133 receives multifunction peripheral identification number 46, described later, from the multifunction peripheral 40. The second communication port 133 may receive setting information 48, described later, or the like, from the multifunction peripheral 40. The second communication port 133 is a logical port. The second communication port 133 communicatively connects to the multifunction peripheral 40 in conformity with a protocol compatible with the LAN. The second communication port 133 is communicatively connected via a wire or wirelessly via the router 30. The second communication port 133 is equivalent to an example of a communication unit.

The third communication port 135 shown in FIG. 2 communicatively connects to the printer 50 via a USB (Universal Serial Bus) cable. The third communication port 135 locally connects to the printer 50. The third communication port 135 receives the printer identification number 56, described later, from the printer 50. The third communication port 135 may receive specification information 58, described later, or the like, from the printer 50. The third communication port 135 is a USB connection connector. The third communication port 135 communicatively connects to the printer 50 in conformity with a protocol compatible with USB. The third communication port 135 is not limited to the USB connection connector. When the printer 50 is communicatively connected via a LAN, the third communication port 135 may be a logical port. The third communication port 135 is equivalent to an example of the communication unit.

The multifunction peripheral 40 has a multifunction peripheral storage unit 41 and a multifunction peripheral communication interface 43. The multifunction peripheral 40 may have a multifunction peripheral control unit, not illustrated, or the like. The multifunction peripheral control unit controls the print function, the copy function and the like of the multifunction peripheral 40. The multifunction peripheral control unit has a cloud print function.

The multifunction peripheral storage unit 41 stores various data, various programs and the like. The multifunction peripheral storage unit 41 stores the multifunction peripheral identification number 46 and the setting information 48. The multifunction peripheral storage unit 41 is formed of a ROM, a RAM or the like. The multifunction peripheral storage unit 41 may have a magnetic storage device such as an HDD, or a semiconductor memory or the like. The multifunction peripheral storage unit 41 is equivalent to an example of a print storage unit.

The multifunction peripheral identification number 46 is a number unique to the multifunction peripheral 40. The multifunction peripheral identification number 46 includes at least one or more of the serial number, the model name, the name of the manufacturer that has manufactured the multifunction peripheral 40, and the like. The multifunction peripheral identification number 46 may be any information that can specify the multifunction peripheral 40. The multifunction peripheral identification number 46 is a device identification number and is equivalent to an example of identification information.

The setting information 48 is information about various settings of the multifunction peripheral 40. The setting information 48 is support information, registration information, network information and the like. The support information is information such as a print command, a sheet size, a sheet type, a resolution, automatic double-sided printing or the like that can be supported by the multifunction peripheral 40. The registration information is information representing whether the multifunction peripheral 40 is already registered with the cloud print server 60 or not. The registration information may include information representing whether the multifunction peripheral 40 is already registered with a server, a service or the like other than the cloud print server 60, or not. The network information is information such as the IP address, the email address, or the MAC address. The setting information 48 is equivalent to an example of registration information.

The multifunction peripheral communication interface 43 communicatively connects to an external device such as the print control device 20 and the cloud print server 60. The multifunction peripheral communication interface 43 connects via a wire or wirelessly in conformity with a predetermined protocol. The multifunction peripheral communication interface 43 transmits the multifunction peripheral identification number 46, the setting information 48 and the like to the print control device 20. The multifunction peripheral communication interface 43 receives data of various protocols from the print control device 20. The multifunction peripheral communication interface 43 can receive print data from the cloud print server 60. The multifunction peripheral communication interface 43 is equivalent to an example of a print communication unit.

The printer 50 has a printer storage unit 51 and a printer communication interface 53. The printer 50 may have a printer control unit, not illustrated. The printer control unit controls printing based on print data.

The printer storage unit 51 stores various data, various programs and the like. The printer storage unit 51 stores the printer identification number 56 and the specification information 58. The printer storage unit 51 is formed of a ROM, a RAM or the like. The printer storage unit 51 is equivalent to an example of the print storage unit.

The printer identification number 56 is a number unique to the printer 50. The printer identification number 56 is the serial number, the model name, the name of the manufacturer that has manufactured the printer 50, or the like. The printer identification number 56 may be any information that can specify the printer 50. The printer identification number 56 is a device identification number and is equivalent to an example of the identification information.

The specification information 58 is information representing the specifications of the printer 50. The specification information 58 includes a print data format that can be processed by the printer 50. The print data format is a format of print data including a dedicated print command unique to the manufacturer of the printer 50, a format of print data including a general-purpose print command such as PWG-Raster, PDF, JPEG, or PostScript, or the like. The specification information 58 may include color/monochrome printing compatibility, print resolution, single-sided/double-sided printing compatibility, the size of a print medium that can be supported, a communication standard or the like. The specification information 58 is equivalent to an example of compatibility information.

The printer communication interface 53 transmits various data such as printer identification number 56 and the specification information 58 to the print control device 20. The printer communication interface 53 receives print data or the like from the print control device 20. The printer communication interface 53 communicatively connects to an external device such as the print control device 20. The printer communication interface 53 connects to the external device via a wire or wirelessly in conformity with a predetermined communication protocol. The printer communication interface 53 shown in FIG. 2 connects in such a way as to be able to communicate with the third communication port 135 of the print control device 20 in conformity with the USB communication standard. The printer communication interface 53 is equivalent to an example of the print communication unit.

The cloud print server 60 has a server storage unit 61 and a server communication interface 63. The cloud print server 60 has a server control unit, not illustrated. The server control unit performs the registration processing of registering the multifunction peripheral 40 or the printer 50 with the cloud print server 60 in response to a registration request from the print control device 20. The server control unit transmits print data to the multifunction peripheral 40 or the like for which the registration processing is performed.

The server storage unit 61 stores various data and various programs. The server storage unit 61 shown in FIG. 2 stores the device list 66. The server storage unit 61 may store a registered device list, not illustrated. The server storage unit 61 may store the control program AP or the like. The server storage unit 61 is formed of a ROM, a RAM or the like. The server storage unit 61 may have a magnetic storage device such as an HDD, or a semiconductor memory or the like.

The device list 66 has device information compatible with the cloud print server 60. The device list 66 is prepared in advance by the provider of the cloud print service. The device list 66 has the device identification number including the model name or the like of a device that can directly transmit and receive data such as print data to and from the cloud print server 60. The device that can directly transmit and receive data can transmit and receive data without using the print control device 20. The device list 66 includes the device identification number about a compatible printer. The device list 66 may include the data format of the device identification number about the compatible printer. The device list 66 is equivalent to an example of the identification information list.

The registered device list stores information about a device for which the registration processing with the cloud print server 60 is performed. The registered device list stores the device identification number of the device for which the registration processing is performed. The registered device list may store information about various specifications of the device for which the registration processing is performed or information set on the device. The registered device list may store a combination of the ID of the user who has caused the registration processing to be executed and the device identification number.

The server communication interface 63 communicatively connects to the print control device 20 via the communication network NW. The server communication interface 63 receives the multifunction peripheral identification number 46, the printer identification number 56 and the like via the print control device 20. The server communication interface 63 can transmit the device list 66 and the like to the print control device 20. The server communication interface 63 communicatively connects to the first communication port 131 of the print control device 20. The server communication interface 63 is connected in such a way as to be able to communicate with the multifunction peripheral communication interface 43 of the multifunction peripheral 40. The server communication interface 63 is communicatively connected in such a way as to be able to transmit print data to the multifunction peripheral 40 without using the print control device 20. The server communication interface 63 is equivalent to an example of a server communication unit.

The print control device 20 connects to the cloud print server 60 via the communication network NW and is connectable to the multifunction peripheral 40. The print control device 20 has the second communication port 133 receiving a reply result of the multifunction peripheral identification number 46 identifying the multifunction peripheral 40 from the multifunction peripheral 40, and the app execution unit 125 causing the cloud print server 60 to execute the registration processing of registering the multifunction peripheral 40. The app execution unit 125 determines whether the multifunction peripheral 40 is a compatible printer compatible with the cloud print server 60 or an incompatible printer incompatible with the cloud print server 60, based on the replay result, and causes the registration processing corresponding to the result of the determination to be executed.

Since the print control device 20 determines whether the multifunction peripheral 40 is compatible with the cloud print server 60 or not, the user need not check whether the multifunction peripheral 40 is compatible with the cloud print server 60 or not, before the registration processing.

Also, the print control device 20 connects to the cloud print server 60 via the communication network NW and is connectable to the printer 50. The print control device 20 has the third communication port 135 receiving a reply result of the printer identification number 56 identifying the printer 50 from the printer 50, and the app execution unit 125 causing the cloud print server 60 to execute the registration processing of registering the printer 50. The app execution unit 125 determines whether the printer 50 is a compatible printer compatible with the cloud print server 60 or an incompatible printer incompatible with the cloud print server 60, based on the replay result, and causes the registration processing corresponding to the result of the determination to be executed.

Since the print control device 20 determines whether the printer 50 is compatible with the cloud print server 60 or not, the user need not check whether the printer 50 is compatible with the cloud print server 60 or not, before the registration processing.

The cloud print system 10 includes the multifunction peripheral 40, the print control device 20, and the cloud print server 60. The multifunction peripheral 40 has the multifunction peripheral storage unit 41 storing the multifunction peripheral identification number 46, and the multifunction peripheral communication interface 43 communicatively connecting to the print control device 20. The print control device 20 has the second communication port 133 communicatively connecting to the multifunction peripheral 40, the first communication port 131 communicatively connecting to the cloud print server 60 via the communication network NW, and the app execution unit 125 causing the cloud print server 60 to execute registration processing of registering the multifunction peripheral 40. The cloud print server 60 has the server communication interface 63 communicatively connecting to the print control device 20 via the communication network NW. The second communication port 133 of the print control device 20 receives a reply result of the multifunction peripheral identification number 46 of the multifunction peripheral 40. The app execution unit 125 of the print control device 20 determines whether the multifunction peripheral 40 is a compatible printer compatible with the cloud print server 60 or an incompatible printer incompatible with the cloud print server 60, based on the reply result, and causes the registration processing corresponding to the result of the determination to be executed.

Since the print control device 20 determines whether the multifunction peripheral 40 is compatible with the cloud print server 60 or not, the user need not check whether the multifunction peripheral 40 is compatible with the cloud print server 60 or not, before the registration processing.

Figure 3:
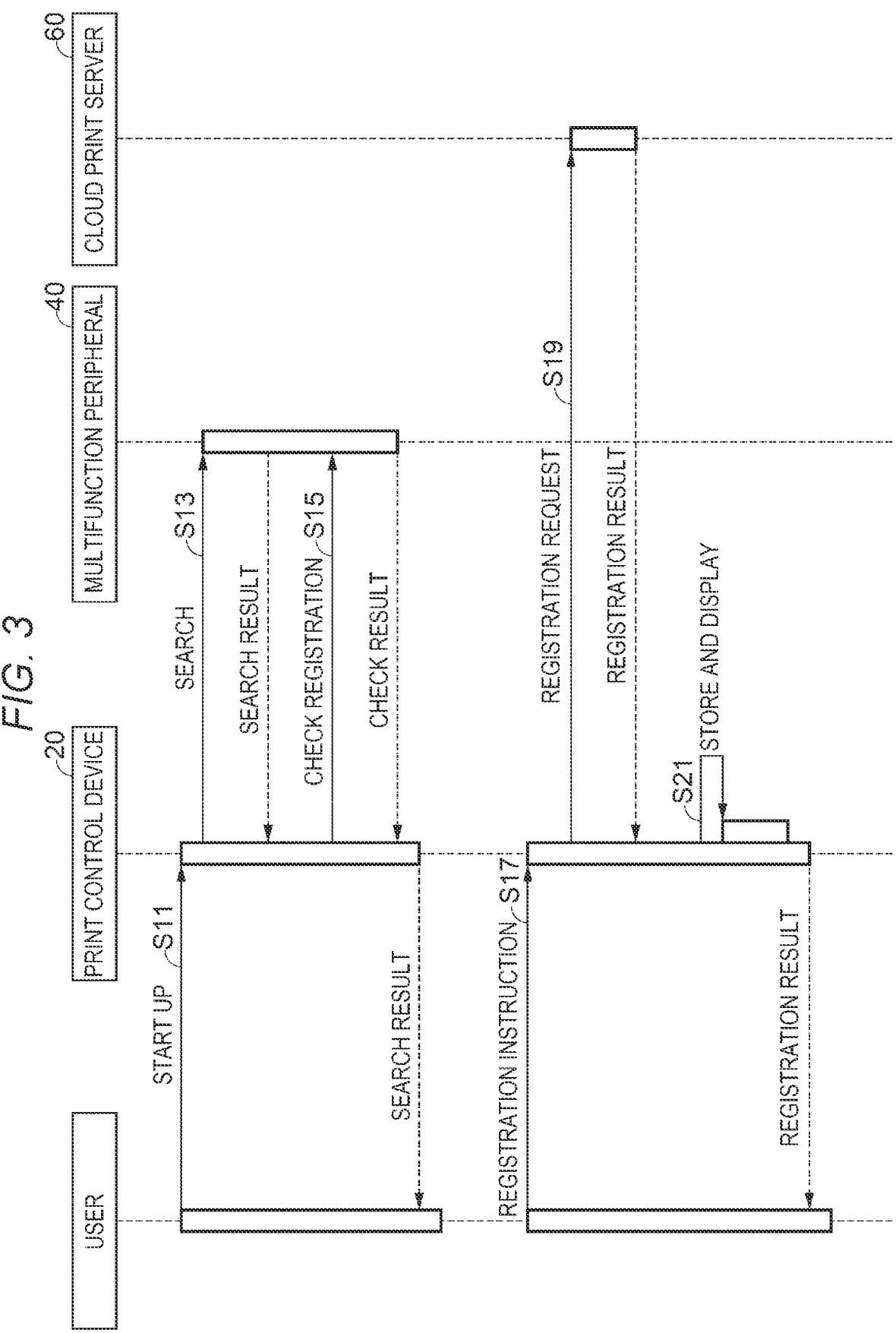
FIG. 3 is a sequence chart of registration processing in the cloud print system.

FIG. 3 shows the sequence of the registration processing in the cloud print system 10. FIG. 3 shows the sequence of the registration processing performed by the user, the print control device 20, the multifunction peripheral 40, and the cloud print server 60. The multifunction peripheral 40 is a device compatible with the cloud print server 60. FIG. 3 shows the sequence in the cloud print system 10 including the multifunction peripheral 40, which is a compatible printer compatible with the cloud print server 60.

In step S11, the user gives the print control device 20 an instruction to start up the print control application. Based on the startup instruction, the print control device 20 executes the control program AP. By executing the control program AP, the print control device 20 starts up the print control application. The print control application causes the control unit 123 to operate as the app execution unit 125.

After starting up the print control application, the print control device 20 in step S13 searches for a device connected to the print control device 20. The app execution unit 125 causes each communication port of the communication interface 129 to transmit a predetermined signal. The predetermined signal is data of a general-purpose protocol. The app execution unit 125 receives a reply to the transmitted predetermined signal, as a search result. The reply is the presence or absence of reply data to the transmitted predetermined signal. Based on the reply, the app execution unit 125 acquires a search result of the device connected to the print control device 20. FIG. 3 shows a case where the multifunction peripheral 40 is connected to the print control device 20. Based on the search result, the print control device 20 acquires a search result to the effect that the multifunction peripheral 40 is communicatively connected to the second communication port 133.

After detecting the multifunction peripheral 40, the print control device 20 acquires various data from the multifunction peripheral 40. The print control device 20 acquires the multifunction peripheral identification number 46 from the multifunction peripheral 40. The print control device 20 collates the acquired multifunction peripheral identification number 46 with the app device list 26. As a result of the collation, the print control device 20 determines that the multifunction peripheral 40 is a compatible printer.

After determining that the multifunction peripheral 40 is a compatible printer, the print control device 20 in step S15 checks whether the multifunction peripheral 40 is already registered with the cloud print server 60 or not. The app execution unit 125 transmits a predetermined inquiry command to the multifunction peripheral 40. The inquiry command is a dedicated protocol predetermined by the provider of the cloud print service. The app execution unit 125 receives a check result to the inquiry command, from the multifunction peripheral 40. Based on the check result, the print control device 20 determines whether the multifunction peripheral 40 is already registered with the cloud print server 60 or not. The inquiry command is equivalent to an example of an acquisition request. The check result is equivalent to an example of registration information.

The print control device 20 causes the search result and the check result to be displayed to the user. The print control device 20 causes the display 80 to display the search result and the check result. The user views the display 80 and thus grasps the search result and the check result. Based on the search result, the user can grasp that the device connected to the print control device 20 is the multifunction peripheral 40. Based on the check result, the user can grasp whether the multifunction peripheral 40 is already registered with the cloud print server 60 or not. When the multifunction peripheral 40 is already registered with the cloud print server 60, the registration processing ends. When the multifunction peripheral 40 is not yet registered with the cloud print server 60, the user determines that the multifunction peripheral 40 is registrable with the cloud print server 60.

After determining that the multifunction peripheral 40 is registrable with the cloud print server 60, the user in step S17 gives a registration instruction to the print control device 20. The app execution unit 125 accepts, from the user, the registration instruction to register the multifunction peripheral 40 with the cloud print server 60.

After accepting the registration instruction, the print control device 20 in step S19 transmits a registration request to the cloud print server 60. The app execution unit 125 transmits the registration request, the multifunction peripheral identification number 46, and the communication address of the multifunction peripheral 40 to the cloud print server 60. The registration request, the multifunction peripheral identification number 46, and the communication address of the multifunction peripheral 40 may be simultaneously transmitted to the cloud print server 60. The multifunction peripheral identification number 46 and the communication address of the multifunction peripheral 40 may be transmitted to the cloud print server 60 after the registration request is transmitted to the cloud print server 60. The communication address may be the IP address, the email address, the MAC address or the like. The communication address may be included in the setting information 48 of the multifunction peripheral 40 and thus transmitted to the cloud print server 60.

The cloud print server 60 performs the registration processing of the multifunction peripheral 40. The registration processing includes establishing a communication connection and saving the registration information. The cloud print server 60 establishes a communication connection with the multifunction peripheral 40, using the communication address of the multifunction peripheral 40 received from the print control device 20. After establishing the communication connection with the multifunction peripheral 40, the cloud print server 60 is in a state of being able to directly transmit print data to the multifunction peripheral 40. The cloud print server 60 also saves a combination of the multifunction peripheral identification number 46 and the communication address of the multifunction peripheral 40 into the registered device list, as the registration information. The cloud print server 60 may save the setting information 48 of the multifunction peripheral 40 in the registered device list.

After performing the registration processing of the multifunction peripheral 40, the cloud print server 60 transmits a registration result to the print control device 20. The registration result is information indicating that the multifunction peripheral 40 is already registered with the cloud print server 60. In step S21, the print control device 20 stores the registration result in the storage unit 121. The print control device 20 causes the display 80 to display the registration result. The user views the display 80 and thus checks the registration result.

FIG. 4 shows the sequence of the registration processing in the cloud print system 10. FIG. 4 shows the sequence of the registration processing performed by the user, the print control device 20, the printer 50, and the cloud print server 60. The printer 50 is a device incompatible with the cloud print server 60. FIG. 4 shows the sequence in the cloud print system 10 including the printer 50, which is an incompatible printer incompatible with the cloud print server 60.

In step S31, the user gives the print control device 20 an instruction to start up the print control application. Based on the startup instruction, the print control device 20 executes the control program AP. By executing the control program AP, the print control device 20 starts up the print control application. The print control application causes the control unit 123 to operate as the app execution unit 125.

After starting up the print control application, the print control device 20 in step S33 searches for a device connected to the print control device 20. The app execution unit 125 causes each communication port of the communication interface 129 to transmit a predetermined signal. The predetermined signal is data of a general-purpose protocol. The app execution unit 125 receives a reply to the transmitted predetermined signal, as a search result. The reply is the presence or absence of reply data to the transmitted predetermined signal. Based on the reply, the app execution unit 125 acquires a search result of the device connected to the print control device 20. FIG. 4 shows a case where the printer 50 is connected to the print control device 20. Based on the search result, the print control device 20 acquires a search result to the effect that the printer 50 is communicatively connected to the third communication port 135.

After acquiring the search result, the print control device 20 causes the display 80 to display the search result. The user views the display 80 and thus checks the search result. The user can acquire the search result to the effect that the printer 50 is connected to the print control device 20.

After checking the search result, the user in step S35 gives the print control device 20 an instruction to register the printer 50. The app execution unit 125 accepts, from the user, the registration instruction to register the printer 50 with the cloud print server 60.

After accepting the registration instruction, the print control device 20 in step S37 acquires the printer identification number 56 from the printer 50. The app execution unit 125 transmits an identification number request that asks for the printer identification number 56, to the printer 50. The identification number request is data of a protocol which the printer 50 is compatible with. The print control device 20 receives the printer identification number 56 from the printer 50 as a result of the transmission of the identification number request.

After receiving the printer identification number 56, the print control device 20 in step S39 converts the printer identification number 56. The app execution unit 125 acquires the data format of the device identification number about the compatible printer from the app device list 26. The app device list 26 stores the data format of the device identification number about the compatible printer from the device list 66 in advance. The app execution unit 125 converts the printer identification number 56, referring to the data format of the device identification number about the compatible printer. The app execution unit 125 converts the printer identification number 56 into a converted printer number. The converted printer number is the device identification number recognized as the compatible printer by the cloud print server 60. The converted printer number includes, for example, information representing the same model name as the compatible printer. The print control device 20 stores the converted printer number in association with the printer identification number 56 in the storage unit 121. The data format of the device identification number about the compatible printer is equivalent to an example of a format compatible with the cloud print server 60. The converted printer number is equivalent to an example of identification information converted into the format compatible with the cloud print server 60.

After converting the printer identification number 56, the print control device 20 in step S41 transmits a registration request to the cloud print server 60. The app execution unit 125 transmits the registration request, the converted printer number, and the communication address of the print control device 20 to the cloud print server 60. The registration request, the converted printer number, and the communication address of the print control device 20 may be simultaneously transmitted to the cloud print server 60. The converted printer number and the communication address of the print control device 20 may be transmitted to the cloud print server 60 after the registration request is transmitted to the cloud print server 60. The communication address may be included in the specification information 58 of the printer 50 and thus transmitted to the cloud print server 60.

The cloud print server 60 performs the registration processing of the printer 50. The registration processing includes establishing a communication connection and saving the registration information. The cloud print server 60 establishes a communication connection, using the communication address of the print control device 20 as the connection destination of the printer 50. After establishing the communication connection using the print control device 20 as the connection destination of the printer 50, the cloud print server 60 is in a state of being able to transmit print data to the print control device 20. The cloud print server 60 is in a stable of being able to transmit print data to the print control device 20 as a virtual printer corresponding to the printer 50. The cloud print server 60 also saves a combination of the converted printer number and the communication address of the print control device 20 into the registered device list, as the registration information. The cloud print server 60 may save the specification information 58 of the printer 50 in the registered device list. The cloud print server 60 performs the registration processing, using the print control device 20 as a virtual printer having the converted printer number. The print control device 20, instead of the printer 50, is enabled to receive print data from the cloud print server 60.

After performing the registration processing, the cloud print server 60 transmits a registration result to the print control device 20. The registration result is information indicating that the virtual printer having the converted printer number is already registered with the cloud print server 60. In step S43, the print control device 20 stores the registration result in the storage unit 121. Based on the registration result, the print control device 20 generates display data to the effect that the printer 50 is registered with the cloud print server 60. The print control device 20 causes the display 80 to display the display data. The user views the display 80 and thus checks the registration result to the effect that the printer 50 is registered with the cloud print server 60.

FIG. 5 shows a control flow in the print control device 20 for the registration processing. FIG. 5 shows a first control example by the print control device 20. FIG. 5 shows a control flow executed as the control program AP operates in the print control device 20. FIG. 5 shows a control flow executed when one device of the multifunction peripheral 40 and the printer 50 is connected to the print control device 20. FIG. 5 shows a control flow in the case where compatibility information about whether the device is compatible with the cloud print server 60 or not is acquired, using data of a dedicated protocol.

In step S101, the print control device 20 searches for a device connected to the print control device 20. The app execution unit 125 transmits a predetermined signal from each communication port of the communication interface 129. The predetermined signal is data of a general-purpose protocol. The print control device 20 receives a response to the transmitted predetermined signal. When the print control device 20 has received the response, the print control device 20 determines that the device is connected to the communication port that has received the response.

After searching for the device, the print control device 20 in step S103 acquires compatibility information of the device connected to the communication interface 129. The compatibility information is information representing whether the device is compatible with the cloud print server 60 or not. The app execution unit 125 transmits a compatibility information request for the dedicated protocol and receives a reply result to the compatibility information request, from the device. The reply result is the presence or absence of reply data and the content included in the reply data. Based on the reply result, the app execution unit 125 acquires the compatibility information. The app execution unit 125 also acquires a device type. The app execution unit 125 transmits the data of the genera-purpose protocol and acquires the device type. The device type represents whether the device has a print function or not.

After acquiring the compatibility information, the print control device 20 in step S105 determines whether the device is a device compatible with the cloud print server 60 or not. When the app execution unit 125 has determined that the device connected to the communication interface 129 is the multifunction peripheral 40 (YES in step S105), the print control device 20 proceeds to step S107. The multifunction peripheral 40 is a compatible printer. When the app execution unit 125 has determined that the device connected to the communication interface 129 is the printer 50 (NO in step S105), the print control device 20 proceeds to step S109. The printer 50 is an incompatible printer.

When the print control device 20 has determined that the connected device is the multifunction peripheral 40, the print control device 20 in step S107 determines whether the multifunction peripheral 40 is already registered with the cloud print server 60 or not. The app execution unit 125 transmits a predetermined inquiry command to the multifunction peripheral 40 via the second communication port 133. The print control device 20 receives a check result to the inquiry command, from the multifunction peripheral 40 via the second communication port 133. Based on the check result, the print control device 20 determines whether the multifunction peripheral 40 is already registered with the cloud print server 60 or not.

When the print control device 20 has determined that the multifunction peripheral 40 is already registered with the cloud print server 60 (YES in step S107), the print control device 20 ends the registration processing control. When the print control device 20 has determined that the multifunction peripheral 40 is not registered with the cloud print server 60 yet (NO in step S107), the print control device 20 determines that the multifunction peripheral 40 is registrable with the cloud print server 60. The print control device 20 proceeds to step S113.

When the print control device 20 has determined that the connected device is the printer 50, the print control device 20 in step S109 acquires the printer identification number 56 and the specification information 58. The app execution unit 125 transmits an identification number request inquiring about the printer identification number 56 to the printer 50 via the third communication port 135. The app execution unit 125 transmits a specification information request inquiring about the specification information 58 to the printer 50 via the third communication port 135. The app execution unit 125 acquires the printer identification number 56 as a response result to the identification number request via the third communication port 135. The app execution unit 125 acquires the specification information 58 as a response result to the specification information request via the third communication port 135.

After acquiring the printer identification number 56 and the specification information 58, the print control device 20 in step S111 determines whether the printer 50 is registrable with the cloud print server 60 or not. The app execution unit 125 determines whether the printer 50 is registrable or not, based on the specification information 58. In an example, the app execution unit 125 determines whether the printer 50 is registrable or not, based on a data format printable by the printer 50 included in the specification information 58. When the printer 50 can support print data including a general-purpose print command such as PDF, the app execution unit 125 determines that the printer 50 is registrable. When the app execution unit 125 has determined, based on the specification information 58, that the printer 50 is registrable with the cloud print server 60 (YES in step S111), the print control device 20 proceeds to step S113. When the app execution unit 125 has determined, based on the specification information 58, that the printer 50 is not registrable with the cloud print server 60 (NO in step S111), the print control device 20 ends the registration processing control.

In step S113, the print control device 20 performs the creation and display of a device list. The device list shows the device registrable with the cloud print server 60 in the form of a list. In the control flow shown in FIG. 5, a case where the multifunction peripheral 40 or the printer 50 is connected as the device is illustrated. The device list shows the device name of the multifunction peripheral 40 or the printer 50. When a plurality of registrable devices are connected to the print control device 20, the device list shows the device names of the plurality of registrable devices. The app execution unit 125 creates a device list and causes the display 80 to display the created device list.

After displaying the device list, the print control device 20 accepts a registration instruction in step S115. When the user has selected a device from the device list, the print control device 20 accepts a registration instruction for the device.

When the print control device 20 has determined in step S117 that the device for which the registration instruction is given is the multifunction peripheral 40, which is a compatible printer (YES in step S117), the print control device 20 proceeds to step S121. When the print control device 20 has determined in step S117 that the device for which the registration instruction is given is the printer 50, which is an incompatible printer (NO in step S117), the print control device 20 proceeds to step S119.

In step S119, the print control device 20 converts the printer identification number 56 into a converted printer number corresponding to the cloud print server 60. The app device list 26 stores the data format of the device identification number about the compatible printer from the device list 66 in advance. The app execution unit 125 converts the printer identification number 56 into the converted printer number, referring to the data format of the device identification number about the compatible printer. The print control device 20 stores the converted printer number in association with the printer identification number 56 in the storage unit 121. After converting the printer identification number 56 into the converted printer number, the print control device 20 proceeds to step S121.

In step S121, the print control device 20 requests the cloud print server 60 to register the device. The print control device 20 causes the cloud print server 60 to execute the registration processing of the multifunction peripheral 40 or the printer 50. The print control device 20 causes the cloud print server 60 to execute different registration processing between the multifunction peripheral 40 and the printer 50.

When requesting the cloud print server 60 to register the multifunction peripheral 40, the print control device 20 transmits a registration request for the multifunction peripheral 40 to the cloud print server 60. The print control device 20 transmits the registration request, the multifunction peripheral identification number 46, and the communication address of the multifunction peripheral 40 to the cloud print server 60. The cloud print server 60 establishes a communication connection with the multifunction peripheral 40 and saves registration information, using the multifunction peripheral identification number 46 and the communication address of the multifunction peripheral 40 thus received. The cloud print server 60 saves the multifunction peripheral identification number 46 and the communication address of the multifunction peripheral 40 in association with each other.

When requesting the cloud print server 60 to register the printer 50, the print control device 20 transmits a registration request for the printer 50 to the cloud print server 60. The print control device 20 transmits the registration request, the converted printer number, and the communication address of the print control device 20 to the cloud print server 60. The cloud print server 60 establishes a communication connection with the print control device 20 as a virtual printer and saves registration information, using the converted printer number and the communication address of the print control device 20 thus received. The cloud print server 60 saves the converted printer number and the communication address of the print control device 20 in association with each other.

The print control device 20 receives a registration result to the registration request, from the cloud print server 60. On receiving the registration result, the print control device 20 ends the registration processing control. The multifunction peripheral 40 or the printer 50 is registered with the cloud print server 60. The multifunction peripheral 40 or the printer 50 can print print data transmitted from the cloud print server 60.

The print control method for causing the registration processing of registering the multifunction peripheral 40 with the cloud print server 60 to be executed is provided. The print control method includes receiving a reply result of the multifunction peripheral identification number 46 of the multifunction peripheral 40, determining whether the multifunction peripheral 40 is a compatible printer compatible with the cloud print server 60 or an incompatible printer incompatible with the cloud print server 60, based on the reply result, and causing the registration processing corresponding to the result of the determination to be executed.

Since the print control device 20 determines whether the multifunction peripheral 40 is compatible with the cloud print server 60 or not, the user need not check whether the multifunction peripheral 40 is compatible with the cloud print server 60 or not, before the registration processing.

The control program AP operating in the print control device 20 for causing the registration processing of registering the multifunction peripheral 40 with the cloud print server 60 to be executed is provided. The control program AP causes the print control device 20 to receive a reply result of the multifunction peripheral identification number 46 of the multifunction peripheral 40, determine whether the multifunction peripheral 40 is a compatible printer compatible with the cloud print server 60 or an incompatible printer incompatible with the cloud print server 60, based on the reply result, and cause the registration processing corresponding to the result of the determination to be executed.

Since the print control device 20 determines whether the multifunction peripheral 40 is compatible with the cloud print server 60 or not, the user need not check whether the multifunction peripheral 40 is compatible with the cloud print server 60 or not, before the registration processing.

When the app execution unit 125 has determined that the printer 50 is an incompatible printer, the app execution unit 125 causes the third communication port 135 to receive the specification information 58 representing whether registration with the cloud print server 60 can be achieved from the printer 50 or not. The app execution unit 125 determines whether to perform the registration processing or not, based on the specification information 58.

The print control device 20 can acquire the information about whether compatibility with the cloud print server 60 can be achieved from the printer 50 or not.

The third communication port 135 receives the printer identification number 56 of the printer 50 from the printer 50. When the app execution unit 125 has determined that the printer 50 is an incompatible printer, the app execution unit 125 converts the printer identification number 56 into a data format compatible with the cloud print server 60 and performs the registration processing of the printer 50, using the converted printer number.

The print control device 20 can register the printer 50, which is an incompatible printer, with the cloud print server 60.

When the app execution unit 125 has determined that the multifunction peripheral 40 is a compatible printer, the app execution unit 125 transmits an inquiry command for registration information representing whether the multifunction peripheral 40 is already registered with the cloud print server 60 or not, to the multifunction peripheral 40. The second communication port 133 receives a check result to the inquiry command.

When it is determined that the multifunction peripheral 40 is a compatible printer, the print control device 20 inquires of the multifunction peripheral 40 about whether the multifunction peripheral 40 is already registered or not, and thus can prevent the execution of unnecessary registration processing.

FIG. 6 shows a control flow in the print control device 20 for the registration processing. FIG. 6 shows a second control example by the print control device 20. FIG. 6 shows a control flow executed as the control program AP operates in the print control device 20. FIG. 6 shows a control flow executed when one device of the multifunction peripheral 40 and the printer 50 is connected to the print control device 20. FIG. 6 shows a control flow in the case where whether the multifunction peripheral 40 or the printer 50 is compatible with the cloud print server 60 or not is determined, using the device list 66 or the app device list 26.

In step S201, the print control device 20 searches for a device connected to the print control device 20. The app execution unit 125 transmits a predetermined signal from each communication port of the communication interface 129. The predetermined signal is data of a general-purpose protocol. The print control device 20 receives a response to the transmitted predetermined signal. When the print control device 20 has received the response, the print control device 20 determines that the device is connected to the communication port that has received the response.

After searching for the device, the print control device 20 in step S203 acquires the device identification number of the device connected to the communication interface 129. The device identification number is the multifunction peripheral identification number 46 or the printer identification number 56. The app execution unit 125 transmits data inquiring about the identification number to the communication port to which the device is connected. The data inquiring about the identification number is the data of the general-purpose protocol. The app execution unit 125 acquires the device identification number as a reply result to the data inquiring about the identification number.

After acquiring the device identification number, the print control device 20 in step S205 collates the acquired device identification number with the device list 66 or the app device list 26. By collating the device identification number, the print control device 20 determines whether the device connected to the communication port is a compatible printer or an incompatible printer. The app execution unit 125 collates the acquired device identification number with the app device list 26. The app execution unit 125 reads out the app device list 26 from the storage unit 121 and collates the device identification number. In step S205, the app execution unit 125 may download the device list 66 from the cloud print server 60 and collate the device identification number with the device list 66. The app execution unit 125 may transmit the acquired device identification number to the cloud print server 60. The cloud print server 60 collates the received device identification number with the device list 66. The cloud print server 60 transmits a collation result of the collation to the first communication port 131 of the print control device 20. The app execution unit 125 acquires the collation result via the first communication port 131.

When the device identification number corresponds to the data in the app device list 26 or the device list 66, the app execution unit 125 determines that the device having the device identification number is a compatible printer. When the device identification number is the multifunction peripheral identification number 46, the app execution unit 125 determines that the multifunction peripheral 40 is a compatible printer. The app execution unit 125 stores information that the multifunction peripheral 40 is a compatible printer, as the result of the determination, in the storage unit 121. When the device identification number corresponds to the data in the app device list 26 or the device list 66 (compatible in step S205), the print control device 20 proceeds to step S207.

The print control device 20 in step S207 determines whether the multifunction peripheral 40 is already registered with the cloud print server 60 or not. The app execution unit 125 transmits a predetermined inquiry command to the multifunction peripheral 40 via the second communication port 133. The print control device 20 receives a check result to the inquiry command, from the multifunction peripheral 40 via the second communication port 133. Based on the check result, the print control device 20 determines whether the multifunction peripheral 40 is already registered with the cloud print server 60 or not.

When the print control device 20 has determined that the multifunction peripheral 40 is already registered with the cloud print server 60 (YES in step S207), the print control device 20 ends the registration processing control. When the print control device 20 has determined that the multifunction peripheral 40 is not registered with the cloud print server 60 yet (NO in step S207), the print control device 20 determines that the multifunction peripheral 40 is registrable with the cloud print server 60. The print control device 20 proceeds to step S209.

When the device identification number does not correspond to the data in the app device list 26 or the device list 66, the app execution unit 125 determines that the device having the device identification number is an incompatible printer. When the device identification number is the printer identification number 56, the app execution unit 125 determines that the printer 50 is an incompatible printer. The app execution unit 125 stores information that the printer 50 is an incompatible printer, as the result of the determination, in the storage unit 121. When device identification number does not correspond to the data in the app device list 26 or the device list 66 (incompatible in step S205), the print control device 20 proceeds to step S209.

In step S209, the print control device 20 performs the creation and display of a device list. The device list shows the device connected to the print control device 20 in the form of a list. In the control flow shown in FIG. 6, a case where the multifunction peripheral 40 or the printer 50 is connected as the device is illustrated. The device list shows the device name of the multifunction peripheral 40 or the printer 50. When a plurality of registrable devices are connected to the print control device 20, the device list shows the device names of the plurality of devices. The device list shows the device name of the compatible printer and the device name of the incompatible printer in parallel. The app execution unit 125 creates a device list and causes the display 80 to display the created device list.

After displaying the device list, the print control device 20 accepts a registration instruction in step S211. When the user has selected a device from the device list, the print control device 20 accepts a registration instruction for the device. The print control device 20 determines whether the device for which the registration instruction is given is a compatible printer or an incompatible printer. The print control device 20 determines whether the device for which the registration instruction is given is the multifunction peripheral 40 or the printer 50.

When the print control device 20 has determined in step S213 that the device for which the registration instruction is given is the multifunction peripheral 40, which is a compatible printer (YES in step S213), the print control device 20 proceeds to step S217. When the print control device 20 has determined in step S213 that the device for which the registration instruction is given is the printer 50, which is an incompatible printer (NO in step S213), the print control device 20 proceeds to step S215.

In step S215, the print control device 20 converts the printer identification number 56 into a converted printer number corresponding to the cloud print server 60. The app device list 26 stores the data format of the device identification number about the compatible printer from the device list 66 in advance. The app execution unit 125 converts the printer identification number 56 into the converted printer number, referring to the data format of the device identification number about the compatible printer. The print control device 20 stores the converted printer number in association with the printer identification number 56 in the storage unit 121. After converting the printer identification number 56 into the converted printer number, the print control device 20 proceeds to step S217.

In step S217, the print control device 20 requests the cloud print server 60 to register the device. The print control device 20 causes the cloud print server 60 to execute the registration processing of the multifunction peripheral 40 or the printer 50. The print control device 20 causes the cloud print server 60 to execute different registration processing between the multifunction peripheral 40 and the printer 50.

When requesting the cloud print server 60 to register the multifunction peripheral 40, the print control device 20 transmits a registration request for the multifunction peripheral 40. The print control device 20 transmits the registration request, the multifunction peripheral identification number 46, and the communication address of the multifunction peripheral 40 to the cloud print server 60. The cloud print server 60 establishes a communication connection with the multifunction peripheral 40 and saves registration information, using the multifunction peripheral identification number 46 and the communication address of the multifunction peripheral 40 thus received. The cloud print server 60 saves the multifunction peripheral identification number 46 and the communication address of the multifunction peripheral 40 in association with each other.

When requesting the cloud print server 60 to register the printer 50, the print control device 20 transmits a registration request for the printer 50. The print control device 20 transmits the registration request, the converted printer number, and the communication address of the print control device 20 to the cloud print server 60. The cloud print server 60 establishes a communication connection with the print control device 20 as a virtual printer and saves registration information, using the converted printer number and the communication address of the print control device 20 thus received. The cloud print server 60 saves the converted printer number and the communication address of the print control device 20 in association with each other.

The print control device 20 receives a registration result to the registration request, from the cloud print server 60. On receiving the registration result, the print control device 20 ends the registration processing control. The multifunction peripheral 40 or the printer 50 is registered with the cloud print server 60. The multifunction peripheral 40 or the printer 50 can print print data transmitted from the cloud print server 60.

The print control device 20 has the storage unit 121 storing the app device list 26 about the compatible printer. The app execution unit 125 collates the multifunction peripheral identification number 46 received via the second communication port 133 with the app device list 26 and thus determines whether the multifunction peripheral 40 is a compatible printer or an incompatible printer.

By collating whether the multifunction peripheral 40 is compatible with the cloud print server 60 or not, with the app device list 26, the print control device 20 can determine whether the multifunction peripheral 40 is compatible with the cloud print server 60 or not.

In the first control example, whether the device connected to the print control device 20 is a compatible printer or not is determined, using the data of the dedicated protocol. In the second control example, whether the device connected to the print control device 20 is a compatible printer or not is determined, using the app device list 26 or the device list 66. The method for determining whether the connected device is a compatible printer or not is not limited to these examples. The print control device 20 may determine whether the device is a compatible printer or not, by combining the first control example and the second control example according to need.

What is claimed is:

1. An information processing device connecting to a print server via a network and connectable to a printing device, the information processing device comprising:
a processor determining whether the printing device is a compatible printing device compatible with the print server or an incompatible printing device incompatible with the print server; and
an interface causing the printer server to execute registration processing of registering the printing device according to a result of the determination, wherein
in response to determining that the printing device is the incompatible printing device, the processor further determines, based on a data format printable by the printing device, whether the printing device is registrable with the print server or not.

2. The information processing device according to claim 1, further comprising:
a memory storing an identification information list about the compatible printing device, wherein
the processor collates identification information received from the printing device with the identification information list and thus determines whether the printing device is the compatible printing device or the incompatible printing device.

3. The information processing device according to claim 2, wherein
the memory stores the identification information list received from the print server.

4. The information processing device according to claim 1, wherein
the interface performs the registration processing of the printing device, using identification information received from the printing device and converted into a format compatible with the print server, when it is determined that the printing device is the incompatible printing device.

5. The information processing device according to claim 1, wherein
the interface transmits, to the printing device, an acquisition request for registration information representing whether the printing device is already registered with the print server or not, when it is determined that the printing device is the compatible printing device.

6. A print control method for causing registration processing of registering a printing device with a print server to be executed, the print control method comprising:
determining whether the printing device is a compatible printing device compatible with the print server or an incompatible printing device incompatible with the print server; and
causing the registration processing corresponding to a result of the determination to be executed, wherein
the print control method further comprises determining, based on a data format printable by the printing device, whether the printing device is registrable with the print server or not in response to determining that the printing device is the incompatible printing device.

7. A non-transitory computer-readable storage medium storing a print control program, the print control program operating in an information processing device causing registration processing of registering a printing device with a print server to be executed, the print control program causing the information processing device to:
determine whether the printing device is a compatible printing device compatible with the print server or an incompatible printing device incompatible with the print server; and
cause the registration processing corresponding to a result of the determination to be executed wherein
the print control program further causes the information processing device to determine, based on a data format printable by the printing device, whether the printing device is registrable with the print server or not in response to determining that the printing device is the incompatible printing device.

* * * * *